June 7, 1955

F. G. GRAVES 2,709,992

PISTON AND COMBUSTION CHAMBER CONSTRUCTION
FOR COMPRESSION IGNITION ENGINE

Filed March 7, 1952

INVENTOR.
FREDERICK G. GRAVES
BY

INVENTOR.
FREDERICK G. GRAVES

United States Patent Office 2,709,992
Patented June 7, 1955

2,709,992

PISTON AND COMBUSTION CHAMBER CONSTRUCTION FOR COMPRESSION IGNITION ENGINE

Frederick G. Graves, Cleveland, Ohio, assignor to Ferro Machine and Foundry, Inc., Cleveland, Ohio Application March 7, 1952, Serial No. 275,343

5 Claims. (Cl. 123—32)

This invention relates to internal combustion engines of the type in which ignition is produced by the heat of compression, and in which liquid fuel is injected by high pressure into the engine cylinder in the form of minute streams.

The invention is directed to the provision of an engine of this nature, having unusually high output in relation to the fuel consumption, and having also the general objects of the accomplishment of quick-starting and efficient running at low ratio of compression.

The attainment of quick thorough ignition and combustion at low compression ratios likewise contributes to the attainment of another important objective, namely, that of substantial reduction of the weight of the engine in proportion to the power it may deliver.

As is well recognized in the art, various devices for effective turbulence or agitation of the charge of air within the cylinder during the injection of the fuel have been attempted and carried out to some degree of effectiveness by many different devices and the use of various expedients.

More specifically, an object of the present invention is to effect instantaneous, that is, quickest possible initial ignition or burning in the highly atomized fringe of fuel spray around several minute fuel injection streams, and then cause the carrying of the resultant flame into and thoroughly mixing it with the remainder of the fuel on each combustion power stroke of the piston.

In carrying out the present invention I arrange the surfaces of the head of the piston and the inner face of the cylinder head, so that the minute fuel streams are directed between adjacent diverging surfaces of the piston and cylinder head and toward an upturned surface on the piston and over a novel arrangement of spiral scoops formed in the sloping surface of the piston.

I have found that in the use of such spiral scoops or grooves that the angular initial direction of each fuel stream must have a precise relationship to the adjacent curving scoop.

When properly arranged, as will hereinafter appear, a much higher degree of efficiency in power and in the effecting of shortest possible ignition and completeness of burning is attained.

A specific example of the present invention is illustrated in the accompanying drawings to which the following description relates, and in which.

Figure 3:
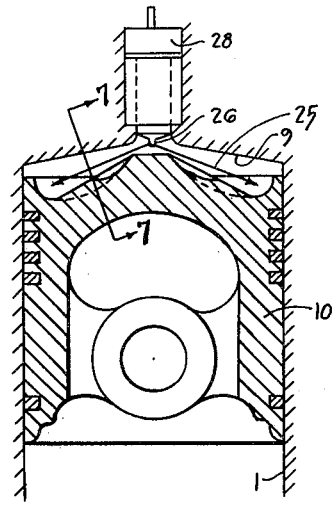
Fig. 3 is a fragmentary view of the piston in the position shown in Fig. 1, the view being taken on a plane at right angles to that of Fig. 1.
Figure 7:
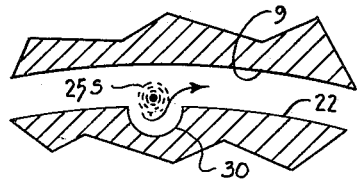
Fig. 7 is an enlarged fragmentary detail taken on a plane at right angles to a jet stream, as indicated by the line 7—7 of Fig. 3, and showing the cross section and the adjacent surfaces of piston and cylinder of one of the scoops.

A suitable cylinder member 1, which may be waterjacketed or air-cooled, has fitted thereon a suitable cylinder head 2. The principle of the present combustion chamber and resulting ignition may be adopted for either the two-cycle or four-cycle type of engine. In the latter case, intake and exhaust valves, indicated at 5 and 6, are arranged to close respective ports opening into and from the cylinder in the usual manner. However, the valve heads proper, 7 and 8, are preferably sloped to conform to the sloping surface 9 of the cylinder head (Figs. 3 and 7), as will presently appear.

A piston 10 slidable in the cylinder 1 is shown as comprising the usual parts—essentially a skirt portion provided with wrist pin bosses 12 integral therewith, a closed upper end wall 15 and suitable rings 17 and 18.

The inner end of the piston, that is, the upper face of the wall 15 has a special configuration, as follows:

At the perimeter is formed an upwardly extending flange 20 having a narrow flat top face. Within this flange the surface is curved inwardly and downwardly at 21, forming an annular trough, and is then sloped upwardly along a conical surface 22 terminating at the flattened portion indicated at 24. Contours of this general nature have heretofore been used, but there are critical relationships of dimensions of this central protuberance and the depth of the annular trough, and, likewise, the height of the flange 20 has a preferred relationship to the slope of the inner cylinder wall and to the direction of the fuel jets. The height of the cone above the trough may be approximately one-sixth to one-fifth of the diameter of the piston.

Figure 1:
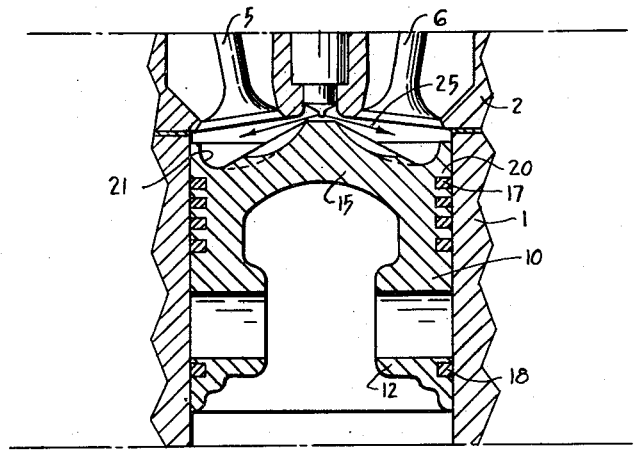
Fig. 1 is a fragmentary sectional view through a piston and cylinder embodying my invention, and showing the piston in its innermost or dead center position.
Figure 2:
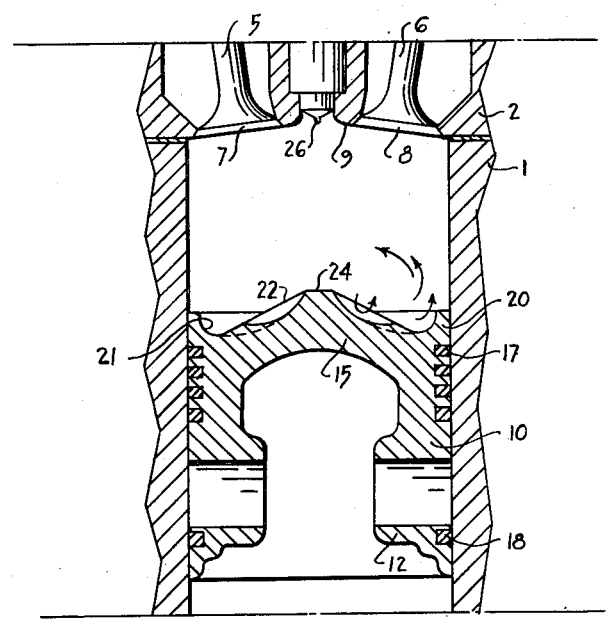
Fig. 2 is a similar fragmentary section showing the piston in an outer position at the beginning of its compression stroke.

As appears in Fig. 1, the fuel jets are illustrated by arrows 25, as directed substantially midway between the sloping surface 9 and sloping inner faces of the valve heads 7 and 8, and the slope of the surface 22 of the piston, when the piston is at the innermost or dead center position.

As indicated, a plurality of these jets are used, the injection nozzle 26 having a predetermined number of minute, accurately spaced and directed discharge openings, and being mounted in a nozzle holder, indicated at 28, and operated in the usual fashion to intermittently force a predetermined amount of fuel through the discharge orifices into the cylinder at an exact time with relation to the power stroke of the piston.

Figure 4:
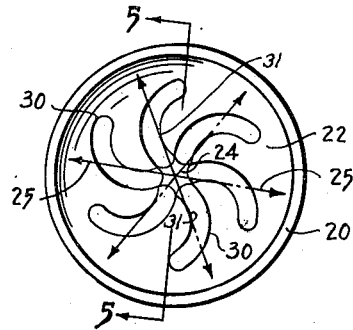
Fig. 4 is a plan of the piston showing the spiral scoops on the upper sloping face, with arrows indicating the preferred direction and relative angular position of the fuel injection streams.
Figure 5:
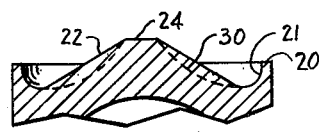
Fig. 5 is a fragmentary detail of the top of the piston, taken on a plane indicated by the lines 5—5 of Fig. 4.

In the illustration I have shown six injection streams, as appears in Fig. 4, preferably equally angularly spaced.

In the surface 22 are provided the spiral scoops 30. These preferably have a curvature and extent such that they may begin adjacent the central upper flattened zone surface 24, and extend downwardly and outwardly in substantially uniform curves, terminating at approximately the depth of the annular trough 21 at the deepest portion, and adjacent to the upturned portion of the surface at the inside of the flange 20. The width of these scoops is preferably such that at their inner ends they constitute approximately sixty degrees of the circumference of the flattened portion 24, and their depth is one-half or more of their width.

The curvature of these scoops 30 is preferably such that they start outwardly radially, and then turn toward and approach a tangential direction as they reach the bottom of the annular trough, inside of the flange 20.

The radius of curvature may vary, and additional groove-like scoops may be added. However, the superior results so far attained have been with the arrangement approximately as illustrated in the drawings and as herein described.

For example, exceptionally good results have been accomplished by approximately the following proportions:

In a four inch piston, the scoops may be from a quarter to five-sixteenths of an inch or more in width, and from one-eighth to three-sixteenths of an inch in depth, at the deepest portions—tapering to lesser depth toward each end. The radial distance from tip to tip of the scoops may be from an inch and a quarter to an inch and a half. These dimensions correspond approximately to the proportions illustrated in the accompanying drawings.

It has been found that best results are attained if the jets 25 are arranged to project over each of the curved scoops in the relation indicated at Fig. 4, namely, each jet direction is substantially parallel with the inner radial direction of the upper and inner ends of a scoop, and preferably slightly toward the outward portion of its curve. Near the center of the piston the jet is approximately tangential to the shorter radius at the inner side edge curve, as indicated at 31 (Fig. 4).

In contrast, it has been found that if the direction of the fuel jets is such as to be approximately midway between the positions shown in Fig. 4, and just described, the results are noticeably inferior.

When the jets are not in the best angular position over the grooves, the marked differences are substantial reduction in horse power, delayed ignition, incomplete combustion and smoke in the exhaust.

Figure 6:
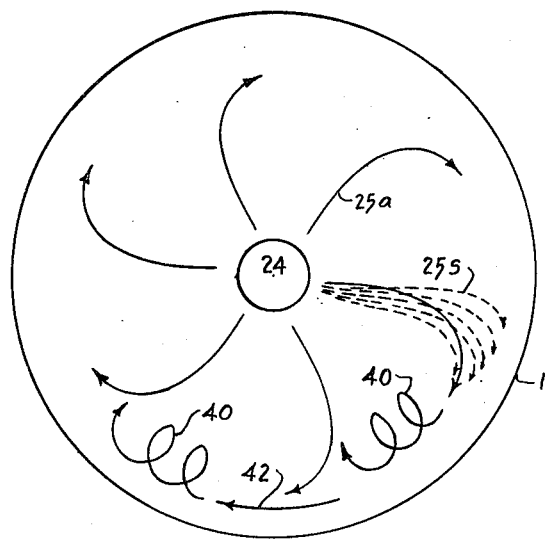
Fig. 6 is a diagrammatic view indicating the action of the air currents on the fuel streams.

As indicated in the drawings, on the inward stroke of the piston the surfaces of the cone, trough and flange tend to create a flow of air upwardly at the flange, while the spiral grooves tend to effect a spinning of the body of the air being compressed, creating a compound group of rapidly flowing currents, such as indicated by the arrows 40 and 42 in Fig. 6.

The jets 30, starting outwardly from the center on an angle midway between the surfaces 9 and 22 of the cylinder head and piston, are thus projected into these currents. It has been found that the whirling and spinning air arrests the outwardly flowing jet and deflects the outer portion of it sufficiently to prevent impingement of fuel against the flange 20.

Figure 8:
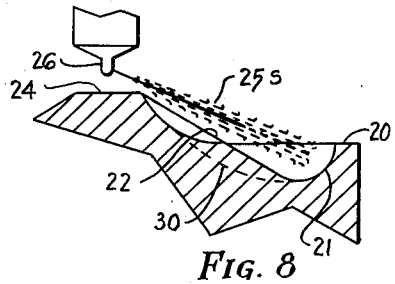
Fig. 8 is a fragmentary detail illustrating one of the fuel streams and an adjacent portion of one of the scoops in the piston head.

The curve of the jet so deflected by the movement of the compressed air currents is indicated by the arrows 25a in Fig. 6. The fine particles of the fuel jet, at first surrounding the central stream, and indicated in Figs. 6 and 8 at 25s, take paths curving circumferentially as appears at 25s in Fig. 6.

The following is a discussion of the phenomenon effecting ignition and combustion in my engine. The explanation seems justified by the improved results, i. e., starting on low compression without auxiliary ignition means; improved efficiency and power delivery while running on low compression, economical fuel consumption, and smoke-free exhaust.

The fuel injection, as indicated, occurs at, or approximately at, the inner end of the compression stroke of the piston. These fuel streams, indicated by the arrows 25, are very minute, and in a small engine are ejected from openings as small as five or six-thousandths of an inch in diameter. For larger cylinders, they range upward to ten or fifteen thousandths or more in diameter.

As is well known, the streams are impelled under very high pressure, and the time of injection is very short, the streams being cut off at a time when the piston has moved only a short distance on its outward stroke. Such a stream, as with any other liquid forced through an opening, has a comparatively solid core for a measurable distance away from the jet opening. However, immediately in the flowing stream there begins the formation of extremely minute particles breaking away from the more solid stream.

The shape of the jet may be that of a dense central portion with a zone of progressively finer spray particles, the extremely fine particles constituting the outer portion of a narrow cone, forming what for convenience may be called a "fringe area."

In proportion to its volume, the smaller the particle the relatively greater is the amount of air in contact with its surface. Thus, according to recognized principles, the more finely divided the spray, the more readily the particles may be ignited. As the small particles are ignited, resulting rise in temperature in immediate proximity effects the ignition of the more closely adjacent larger particles.

In other words, the more uniformly and instantaneously the ignition of minute particles, the quicker and more completely will be the kindling of the progressively heavier particles.

It may be stated, therefore, that by effecting quick and certain ignition of fine particles in the fringe area around each jet, the resulting complete and quick ignition of the larger particles approaches the desired ideal of quick and complete ignition of all the fuel.

Obviously, to assure complete ignition, it is necessary to effect thorough intermingling of all the air with the flaming fuel of the fuel jets assuring the combustion of the heavier particles. This progressive ignition must occur during the movement of the piston on its outward or power stroke. At the end of the power stroke, of course, the exhaust valve opens, and combustion should then be as nearly complete as possible.

With the structure described at the completion of the compression stroke of the piston, the air is moving in such a manner that each jet is subjected to its own exceptionally high individual zone of air flow. Ignition of the fringe area of each jet is thereby assured. The curvature of the grooves 30 causes the circular whirling intermingled with the spinning action effected by the curved inner surface 21 of the piston flange.

This whirling and spinning air flow deflects even the heaviest portion of the outer end of the jets, as indicated at 25a and 25s in Fig. 6, and the jets of fuel are so quickly and completely ignited that various tests and inspections show that the jet stream does not reach the surface 21 nor impinge on the cylinder wall.

By reason of the curvature of the grooves 30 and the circumferential and whirling movement of the air, as indicated by the arrows 40 and 42, the main body of each jet is caused to follow the curvature of its groove 30 substantially throughout the length of the groove.

In addition to providing concentrated flow upwardly toward the jets in their curving paths, and effecting the circumferential whirling by setting up this spinning action during the compression stroke, the grooves further act as guides and curved baffles directing the air outwardly into curving paths as the air is forced over the slope of the cone surface 22.

The amount of fuel injected, of course, should be only that required for greatest power with maximum fuel economy, and should not exceed an amount which may be effectively and completely burned.

Regulation of the amount of fuel injected is common practice in the operation of any engine, but with the structure described such an effective ignition is accomplished that combustion is completed at the time of the opening of the exhaust port, thus attaining what will be recognized as an ideal condition.

It will be seen that by the arrangement described I have concentrated the compressed air flow adjacent to each fuel jet in such a way as to ignite the fine particles of the fringe area, and this heat or flame propagates to the balance of the fuel and air mixture, and that I have effected a simple and yet assured circumferential whirling and perimeter spinning action which is of such a nature that it may continue after being set in motion. This assures the necessary intermingling of air and fuel particles needed for complete combustion.

Having thus described my invention, what I claim is:

1. An internal combustion engine designed to start and run on compression alone at approximately eleven atmospheres, and comprising a cylinder and a piston therein, the cylinder including a head having an inner surface of flat conical shape and having valve openings and a fuel injection nozzle rigidly mounted at the center of the cylinder head and having a plurality of evenly spaced fuel jet openings directed at a slight angle downwardly away from the cylinder head, the piston having an end wall surface formation comprising a conical surface sloping away from the center and away from and thus diverging from the cylinder head surface, a circular trough at the base of the cone and a flange forming the outer side of said trough and extending toward the cylinder head to about one-half the height of said cone, the cone having a flattened top and having radially evenly spaced grooves extending from the flattened top to and merging with and terminating at the bottom of said circular trough, there being at least one groove angularly positioned to cause air movement acting upon each jet and the grooves curving at their outer ends toward directions tangential to the circular trough.

2. The engine structure defined in claim 1 in which the grooves in the cone form air scoops, and which extend from the upper central portion of the cone and merge with the bottom of the trough at their outer ends, and in which said scoop grooves are equal in size and of a width approximately between one-tenth and one-twentieth of the diameter of the piston, and the depth of which is approximately one-half or more of the width thereof.

3. A compression ignition type of engine having a cylinder and piston forming a combustion chamber, the cylinder head surface of which is formed in a flat conical shape, a fuel injection nozzle having a plurality of evenly spaced jet openings so directed as to project fuel streams slightly downwardly from and below the cylinder head surface, and the piston head having a centrally located protuberance of conical shape thereon sloping away from the cylinder head and at a greater angle than that of the cylinder head surface, an annular trough-shaped surface formed on and merging with and surrounding the piston cone surface, the cone surface on the piston having a plurality of grooves forming air scoops extending outwardly radially from adjacent the center of the piston and at their outer ends curving toward a direction tangential to and terminating substantially at the cone base and at the bottom of the annular trough.

4. The engine structure defined in claim 3 in which the injection nozzle is rigidly mounted at the center of the cylinder head, and its injection stream jet openings are each so positioned to direct a fuel stream over one of said curving groove scoops.

5. The engine and combustion chamber described in claim 3 in which the scoop grooves are uniformly angularly positioned and are of a width approximately one-tenth to one-twentieth of the diameter of the piston and for a greater part of the length of each are of a depth approximately one-half to three-quarters of the width of the grooves.

References Cited in the file of this patent

UNITED STATES PATENTS

| 2,013,366 | Stearns | Sept. 3, 1935 |
| 2,100,143 | Mock | Nov. 23, 1937 |
| 2,419,096 | Stickney | Apr. 15, 1947 |
| 2,469,448 | Barber | May 10, 1949 |

FOREIGN PATENTS

| 444,806 | Great Britain | Mar. 27, 1936 |
| 570,968 | Great Britain | July 31, 1945 |